US008127412B2

(12) United States Patent
Gleichauf et al.

(10) Patent No.: US 8,127,412 B2
(45) Date of Patent: Mar. 6, 2012

(54) NETWORK CONTEXT TRIGGERS FOR ACTIVATING VIRTUALIZED COMPUTER APPLICATIONS

(75) Inventors: Paul Gleichauf, Saratoga, CA (US);
Mark Bakke, Maple Grove, MN (US);
Timothy Kuik, Lino Lakes, MN (US);
David Thompson, Rogers, MN (US);
Xiaoxue Ma, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 927 days.

(21) Appl. No.: 11/731,728

(22) Filed: Mar. 30, 2007

(65) Prior Publication Data
US 2008/0244747 A1    Oct. 2, 2008

(51) Int. Cl.
*G06F 11/00* (2006.01)
*G06F 12/14* (2006.01)
*G06F 12/16* (2006.01)
*G08B 23/00* (2006.01)

(52) U.S. Cl. .............. 26/22; 726/23; 726/34; 726/25; 713/187; 713/188

(58) Field of Classification Search .................. None
See application file for complete search history.

(56) References Cited

U.S. PATENT DOCUMENTS

| 6,330,715 | B1 * | 12/2001 | Razzaghe-Ashrafi | 717/171 |
|---|---|---|---|---|
| 6,779,117 | B1 * | 8/2004 | Wells | 726/24 |
| 7,260,845 | B2 * | 8/2007 | Kedma et al. | 726/23 |
| 7,272,748 | B1 * | 9/2007 | Conover et al. | 714/20 |
| 7,376,970 | B2 * | 5/2008 | Marinescu | 726/22 |
| 7,475,427 | B2 * | 1/2009 | Palliyil et al. | 726/24 |
| 7,765,410 | B2 * | 7/2010 | Costea et al. | 713/188 |
| 2002/0034942 | A1 | 3/2002 | Khreisat | |
| 2002/0087883 | A1 * | 7/2002 | Wohlgemuth et al. | 713/201 |
| 2002/0144121 | A1 * | 10/2002 | Ellison et al. | 713/176 |
| 2003/0014669 | A1 | 1/2003 | Caceres | |
| 2003/0031129 | A1 | 2/2003 | Dutkiewicz | |
| 2004/0006704 | A1 * | 1/2004 | Dahlstrom et al. | 713/200 |
| 2004/0015728 | A1 * | 1/2004 | Cole et al. | 713/201 |
| 2004/0120290 | A1 | 6/2004 | Makhijani | |
| 2004/0187023 | A1 * | 9/2004 | Alagna et al. | 713/200 |
| 2005/0081053 | A1 * | 4/2005 | Aston et al. | 713/200 |

(Continued)

OTHER PUBLICATIONS

Matthews et al., "Data Protection and Rapid Recovery From Attack With a Virtual Private File Server and Virtual Machine Appliances," Clarkson University, 2005, pp. 1-12.*

(Continued)

*Primary Examiner* — Luu Pham
(74) *Attorney, Agent, or Firm* — Hickman Palermo Truong & Becker LLP (57) ABSTRACT

A computer system, comprising at least one controlled execution space hosting an operating system and an application program; a vulnerability monitoring agent coupled to the controlled execution space; one or more vulnerability profiles coupled to the vulnerability monitoring agent, wherein each of the vulnerability profiles comprises an application program identifier, an operating system identifier, a vulnerability specification describing a vulnerability of an application program that the application program identifier indicates when executed with an operating system that the operating system identifier indicates, and a remedial action which when executed will remediate the vulnerability; wherein the vulnerability monitoring agent is configured to monitor execution of the operating system and the application program in the controlled execution space, to detect an anomaly associated with the vulnerability, to determine the remedial action for the operating system and application program based on one of the vulnerability profiles, and to cause the remedial action.

24 Claims, 5 Drawing Sheets

U.S. PATENT DOCUMENTS

| | | | |
|---|---|---|---|
| 2005/0172019 A1* | 8/2005 | Williamson et al. | 709/223 |
| 2005/0187740 A1* | 8/2005 | Marinescu | 703/1 |
| 2005/0246612 A1* | 11/2005 | Leis et al. | 714/763 |
| 2005/0276218 A1 | 12/2005 | Ooghe | |
| 2006/0075503 A1* | 4/2006 | Bunker et al. | 726/25 |
| 2006/0191010 A1* | 8/2006 | Benjamin | 726/23 |
| 2006/0250968 A1 | 11/2006 | Hudis | |
| 2006/0277433 A1* | 12/2006 | Largman et al. | 714/15 |
| 2007/0106986 A1* | 5/2007 | Worley, Jr. | 718/1 |
| 2007/0174689 A1* | 7/2007 | Chen | 714/13 |
| 2007/0192854 A1* | 8/2007 | Kelley et al. | 726/22 |
| 2007/0199060 A1* | 8/2007 | Touboul | 726/11 |
| 2007/0204347 A1 | 8/2007 | Caceres | |
| 2007/0234040 A1 | 10/2007 | Hurst | |
| 2007/0271360 A1 | 11/2007 | Sahita | |
| 2007/0283007 A1* | 12/2007 | Keir et al. | 709/224 |
| 2007/0283441 A1* | 12/2007 | Cole et al. | 726/25 |
| 2008/0016339 A1* | 1/2008 | Shukla | 713/164 |
| 2008/0120699 A1* | 5/2008 | Spear | 726/4 |
| 2008/0127348 A1* | 5/2008 | Largman et al. | 726/24 |
| 2008/0141286 A1* | 6/2008 | Marinescu | 719/328 |
| 2008/0178298 A1* | 7/2008 | Arai et al. | 726/29 |
| 2008/0189796 A1* | 8/2008 | Linn et al. | 726/30 |
| 2008/0195676 A1* | 8/2008 | Lyon et al. | 707/204 |
| 2009/0038011 A1* | 2/2009 | Nadathur | 726/24 |
| 2009/0222907 A1* | 9/2009 | Guichard | 726/17 |
| 2009/0307764 A1* | 12/2009 | Isobe et al. | 726/7 |

OTHER PUBLICATIONS

Clinton Jeffery, "Monitoring and Visualizing Program Execution an Exploratory Approach," Jan. 1996, pp. 29-99.*

International Bureau, "International Preliminary Report on Patentability and Written Opinion", application No. PCT/US2008/058534, dated Nov. 26, 2009, 8 pages.

Current Claims, application No. PCT/US2008/058534, 8 pages.

ISRWO, dated Jun. 9, 2009, PCT/US 08/58534, pp. 1-8.

Current Claims for PCT application No. US 08/58534, pp. 20-32.

* cited by examiner

NETWORK CONTEXT TRIGGERS FOR ACTIVATING VIRTUALIZED COMPUTER APPLICATIONS

FIELD OF THE INVENTION

The present invention generally relates to network data processing applications. The invention relates more specifically to techniques for activating virtualized computer applications.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Network administrators seek to protect network equipment and software from harm inflicted by defective or malicious systems or applications. A corrupted application or operating system on a host in the network, considered alone, typically is not considered a problem. However, the corrupted application or operating system becomes an issue if the corruption results in infecting other systems or poisoning data, or prevents the operating system from running properly and from properly supervising or hosting applications.

Trusted software agents, embedded in an operating system, can be used to scan local systems for policy violation conditions, and can use information obtained in the scans to make decisions about enabling communications over the network. Systems using such approaches include Network Admission Control (NAC), Network Access Protection (NAP) and/or Trusted Network Connect (TNC).

A network device may be more trusted or less trusted based upon where the device has connected to the network and what software or data has been loaded onto the device. For such devices, the security of a trusted software agent approach depends upon the quality of the protection mechanisms implemented in the agents. A sufficiently determined attacker may be able to overwhelm the protection mechanisms of the agents from within the operating system, thereby corrupt the running operating system and the systems connected to it. Vulnerable operating systems exposed on the Internet are known to be susceptible to attack on ever decreasing time scales.

Additionally, applications are increasingly bound to particular versions of the operating system upon which they run. This binding often includes various versions of the kernel and patches of both the OS and applications. Some of the bindings impact security; others may affect application functionality, and in some cases the bindings affect both security and functionality. Even when vulnerabilities of applications and operating systems are known and patches are available, side effects of applying the patches or other remediation steps may make taking protective actions or performing the remediation less desirable to a network or server administrator than coping with the infection.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Methods and apparatus for activating virtualized operating systems and applications based on network context triggers are disclosed. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Vulnerability Detection and Activation System
   2.1 Functional Overview
   2.2 Example Host, Control System, and Vulnerability Profile
   2.3 Operational Example
3.0 Implementation Mechanisms-Hardware Overview
4.0 Extensions and Alternatives
1.0 General Overview The needs identified in the foregoing Background, and other needs and objects that will become apparent for the following description, are achieved in the present invention, which comprises, in one aspect, a computer system, comprising at least one controlled execution space hosting an operating system and an application program; a vulnerability monitoring agent coupled to the controlled execution space; one or more vulnerability profiles coupled to the vulnerability monitoring agent, wherein each of the vulnerability profiles comprises an application program identifier, an operating system identifier, a vulnerability specification describing a vulnerability of an application program that the application program identifier indicates when executed with an operating system that the operating system identifier indicates, and one or more remedial actions which when executed will remediate the vulnerability; wherein the vulnerability monitoring agent is configured to monitor execution of the operating system and the application program in the controlled execution space, to detect an anomaly associated with the vulnerability, to determine the remedial action for the operating system and application program based on one of the vulnerability profiles according to one or more policy-based rules, and to cause the remedial action.

In one feature, the vulnerability monitoring agent is coupled to a re-imaging system, the re-imaging system is coupled to a repository of copies of applications and operating systems, and the vulnerability monitoring agent is further configured to detect that the application program or the operating system is corrupted, to remove the application program or operating system from the controlled execution space, and to request the re-imaging system to re-image the controlled execution space with a new copy of the application program and the operating system.

In another feature, the vulnerability monitoring agent is further configured to generate a first digital signature based on one or more components or data sets associated with the application program and operating system, to retrieve a trusted second digital signature, and to determine whether the first digital signature matches the second digital signature.

In yet another feature, the vulnerability monitoring agent is coupled to a shared data repository and a re-imaging system, the re-imaging system is coupled to a repository of copies of applications and operating systems, and the vulnerability monitoring agent is further configured to detect that the application program or the operating system is corrupted, to store data (both static data and dynamic run time states) associated with the application program or the operating system in the shared data repository, to remove the application program or operating system from the controlled execution space, and to request the re-imaging system to re-image the controlled execution space with a new copy of the application program and the operating system and restore the saved data.

In still another feature, a management domain controller is coupled to the vulnerability monitoring agent over a network, and the management domain controller is configured to control access to the vulnerability profiles. In yet another feature, the controlled execution space comprises a virtual machine monitor.

In a further feature, the vulnerability monitoring agent, controlled execution space, application program, and operating system are in a first computer, and the vulnerability profiles are in a second computer that is coupled to the first computer over a network. In still another feature, the computer system comprises an I/O stack, the I/O stack comprises a second vulnerability monitoring agent, and the second vulnerability monitoring agent is configured to monitor one or more interactions of the application program or the operating system with the I/O stack. In a related feature, a plurality of instances of the vulnerability monitoring agent are provided, each of the instances is hosted on one of the processor elements (for example, a core on multi-core processors), and each of the instances is configured to communicate information about detected vulnerabilities to other instances over one or more arbitrated socket connections. In this context, the term "I/O stack" refers to a network I/O stack or to a storage I/O stack.

In another feature, the vulnerability monitoring agent is configured to restrict communications over one or more of the network interfaces, restrict use of one or more network resources, restrict use of resources of the computer system, restrict use of network bandwidth, restrict use of one or more network ports, or restrict read and/or write access to certain block devices, file systems, directories, files, and/or registry entries.

In other aspects, the invention encompasses a computer-implemented method and a computer-readable storage medium comprising logic that implements one or more of the above features.

2.0 Example Vulnerability Detection and Activation System 2.1 Functional Overview In one embodiment, a system and method for controlling and monitoring operating systems and applications are provided. One or more operating systems (OS) and corresponding applications (OS-applications) execute in a plurality of controlled execution spaces. The OS and OS-applications are monitored using a monitoring agent. The system stores vulnerability profiles that specify known vulnerabilities of each combination of an OS and set of OS-applications running on top of it. The monitoring agent can detect corruption within the OS and/or OS-applications. In response, the system can impose restrictions on application activation or action based on the vulnerability profiles. Restrictions may comprise prohibiting access or bandwidth consumption, imposing restricted network connectivity or network isolation through traffic restrictions or port limitations, restricting or blocking OS system calls, and other restrictions. Further, in response, the system can erase corrupt software images of the OS and OS-applications along with generated data, and can extract and start up a new copy of the OS and OS-applications along with sanitized data.

In one embodiment, an operating system and OS-applications are run and monitored in an execution isolation system by using a Virtual Machine Monitor (VMM) which allocates memory and controls the computer and networking resources to run images on virtual machines. An execution isolation system may provide multiple controlled execution spaces. For example, a plurality of virtual machines may be used as the controlled execution space. Each virtual machine created by the VMM can run a different OS and set of OS-applications In one feature, the VMM interacts with a Management Domain Controller (MDC) through a monitoring agent. The MDC contains policies for interpreting computational and network requirements and forming instructions for resource allocation. The MDC receives operational information about an OS and OS-application from the VMM's monitoring agent. If a problem is detected in an OS or OS-application, the MDC is notified. The VMM's monitoring agent receives policy instructions pertaining to an OS and OS-application from the MDC.

In one embodiment, a Vulnerability Profile (VP) is used by the monitoring agent to run and survey the OS and OS-applications. A VP associates information identifying the OS, information identifying the OS-applications, information identifying anomalies of particular combinations of an OS and a set of OS-applications, and policy-based actions that can be applied to mitigate problems. The actions can be applied in the configuration of resources by the VMM. For example, if vulnerabilities are known for a particular combination of OS and application set versions, then the configuration and other properties of the combination can be tailored to minimize their impact. Specific examples include limiting the total running time or port configurations, or introducing write permissions. Alternatively, the actions can be applied dynamically as anomalies are detected or anticipated.

In one embodiment, a VP specifies one or more characteristics and one or more vulnerabilities of an OS and OS-applications. Vulnerabilities may include, for example: mechanisms that the OS or OS-applications can potentially use to spread corruption; characteristics or signals that indicate that data poisoning has occurred; the length of time during which a running image can be considered viable; and other vulnerabilities.

In response to detecting a vulnerability, the system can impose numerous kinds of restrictions on application activity. Example restrictions include prohibiting access to network resources; restricting bandwidth consumption by throttling traffic rate; achieving sub network connectivity restrictions or isolation by allowing applications traffic restrictions, port limitations, and OS system calls. For example, when an anomaly or corruption is detected, operations of the OS are restricted using system call monitors. As another example, the types of communication allowed over the network are limited. As another example, read and/or write access to storage such as block devices, file systems, files, and registry entries is limited. As another example, the OS-applications are surveyed for errors in running processes that may require checkpointing the data of the running image and starting up a new copy of the running image.

As another example, a responsive restriction may comprise extracting potentially corrupt data files, running the files through a scrubber to eliminate corruption, and then feeding the files to the restored OS and application set. In this case, the data is cleaned as well as the OS and applications. In an embodiment, only the data is scrubbed, as the OS and applications are not contaminated.

In one embodiment, if corruption of a running image is detected, then a re-imaging system reconstitutes the running image of an OS-application within the virtual machine or VMM-isolated domain, to provide a correct clean image hosted in a SAN or local disk. If re-imaging the OS-application is required, then a copy of data previously created by the corrupt OS system and application is removed and stored in a data repository. When the correct clean image of the OS system and OS-application has been obtained, the stored data is retrieved from the repository and re-inserted into the new clean image. The corrected image is then restarted.

Thus, if there is a known relevant context for the vulnerability then it may be side stepped through monitoring software that inhibits such operations while permitting other mission critical operations to proceed.

2.2 Example Host, Control System, and Vulnerability Profile

Figure 1:
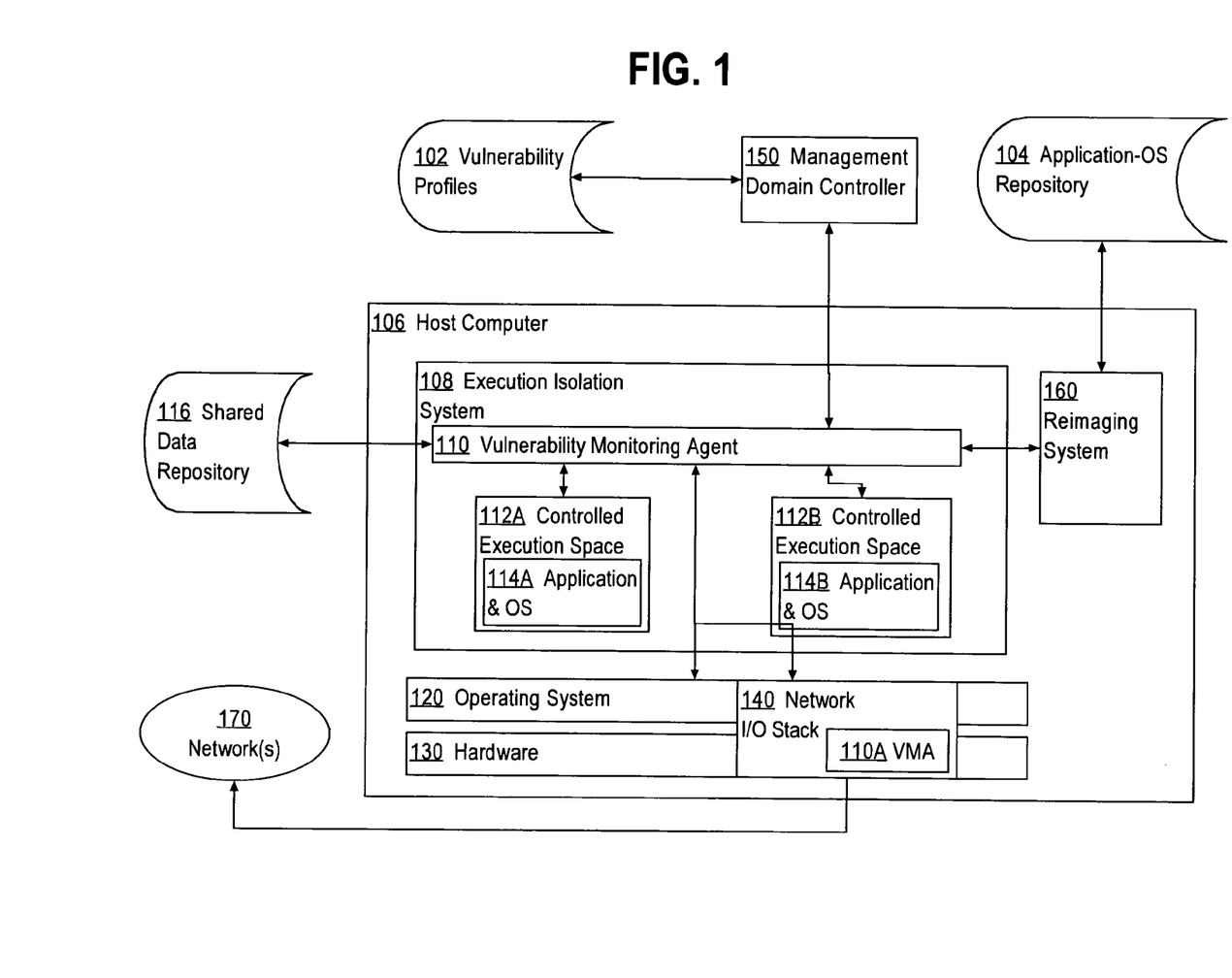
FIG. 1 is a block diagram of an example embodiment of a vulnerability detection and remediation system.

FIG. 1 is a block diagram of an example embodiment of a vulnerability detection and remediation system. A host computer 106 comprises an execution isolation system 108, re-imaging system 160, operating system 120, hardware 130, and input/output (I/O) stack 140. Operating systems and applications executed by the host computer 106 within the execution isolation system 108 are the subject of monitoring and restriction or remediation using the techniques herein.

In an embodiment, host computer 106 is coupled to a network through one or more network interfaces in hardware 130 coupled to the network I/O stack. The network may comprise a local area network, wide area network, internetwork, or a combination thereof. Re-imaging system 160 and a management domain controller 150 may be coupled to host computer 106 using the network.

The execution isolation system 108 comprises a vulnerability monitoring agent 110 coupled to one or more controlled execution spaces 112A, 112B. Each of the controlled execution spaces 112A, 112B hosts an application and operating system, collectively denoted 114A, 114B. There may be any number of execution spaces 112A, 1121B in the execution isolation system 108.

The vulnerability monitoring agent 110 is coupled to management domain controller 150, which is coupled to vulnerability profiles 102. The vulnerability monitoring agent 110 receives instructions for monitoring and policy-based actions from the management domain controller 150. The management domain controller 150 receives operational information about the OS-applications 114A, 114B running within the execution isolation system 108 from the vulnerability monitoring agent 110.

The vulnerability monitoring agent 110 relies on the one or more vulnerability profiles 102 to supervise the OS-applications 114A, 114B within the controlled execution spaces 112A, 1121B. In an embodiment, vulnerability profile 102 comprises information associating characteristics and known vulnerabilities of the operating systems and applications that execute in execution isolation system 108. For example, vulnerability profile 102 comprises, for each combination of an OS and OS-application, information identifying mechanisms the OS and OS-applications potentially use to spread corruption, the effects of data poisoning and the viability of a running image over time. Additionally the vulnerability profile 102 comprises policy-based actions that can be applied to mitigate problems, clean up problems or restrict actions either in the configuration of resources or during operation of an OS or OS-application.

Figure 2:
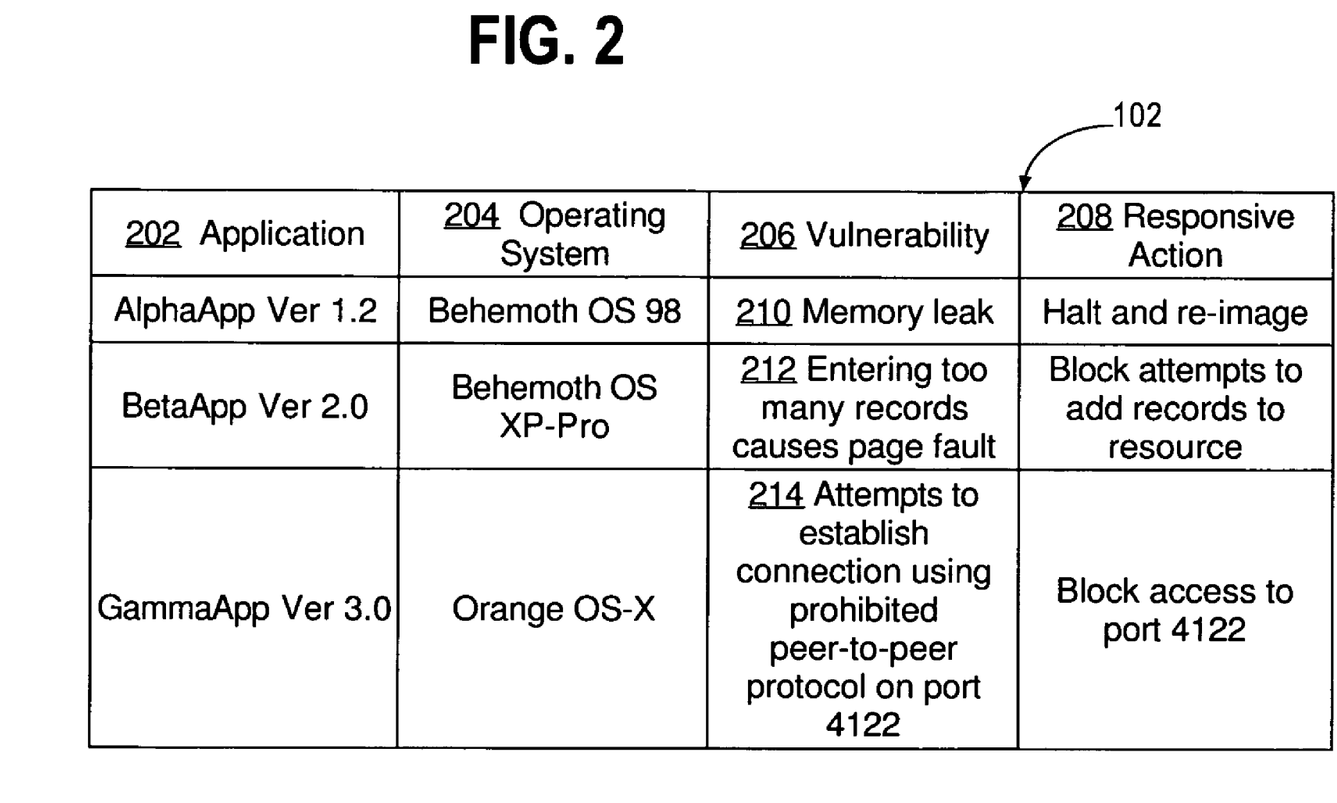
FIG. 2 is a block diagram of an example vulnerability profile.

FIG. 2 is a block diagram of an example vulnerability profile 102. In an embodiment, vulnerability profile 102 is structured as a data table having an application column 202, operating system column 204, and vulnerability column 206. The application column 202 stores identifiers of OS-applications. The operating system column 204 stores identifiers of operating systems that the OS-applications execute under. Each application identified in application column 202 may be associated with multiple different operating systems identified in column 204; thus, column 202 may have duplicate entries. The vulnerability column 206 identifies one or more vulnerabilities of the combination of an application and operating system that appear in the same row as a particular vulnerability entry. Thus, for each of the applications 202 and operating systems 204, one or more associated vulnerabilities 206 are stored and maintained.

In an embodiment, an XML-based profile structures vulnerability information and related policies.

Examples of vulnerabilities include a memory leak as indicated in table entry 210, entering too many records causes page faults as in entry 212, and attempts to establish connection using prohibited peer-to-peer protocol on port 4122 as in entry 214. The values shown in FIG. 2 are examples and any other suitable values may be used.

In an embodiment, vulnerability profile 102 further comprises a policy column 208 that identifies responsive policies or restrictions that the system should impose when the indicated vulnerability is detected. Alternatively, policies or restrictions may be stored in management domain controller 150.

The management domain controller 150 monitors the host computer 106 to determine whether the operating systems and associated applications are operating properly, or are corrupted, or have generated anomalies. In one embodiment, the management domain controller 150 runs on the host computer 106. In another embodiment, the management domain controller executes on a particular processor core of the host computer. Alternatively, the management domain controller 150 may be hosted on a separate computer. Further, the management domain controller 150 may first operate on the host computer 106 and then migrate to a separate computer when the host computer 106 is under threat, or to provide services that consume more resources than the processor of the host computer can provide.

The management domain controller 150 communicates with the execution isolation system 108. The execution isolation system 108 manages communication to OS-applications 114A, 114B and operating systems. The execution isolation system 108 can implement restrictive actions on any of the operating systems. Alternatively, the execution isolation system 108 can manage booting one of the operating systems.

In one embodiment, the monitoring and control functions described herein for the management domain controller 150 can be embedded in the execution isolation system 108. Alternatively, the I/O stack 140 functions to control communications across shared memory. The I/O stack 140 relies upon processor and memory virtualization for hardware and software. Stack 140 may comprise a network I/O stack, storage I/O stack, or other I/O stack. In an embodiment, stack 140 comprises a network I/O stack and a separate storage I/O stack 142 provides access to shared data repository 116.

The communication of data between OS-applications 114A, 114B can be inspected through network-based agents, using vulnerability monitoring agent 110 in the execution isolation system 108 or in a separate and heterogeneous guest OS providing switching and routing of network traffic, monitoring for common embedded code signatures. Examples of common embedded code signatures include macros, Javascript, Java VM code, and binaries.

In an embodiment, host computer 106 comprises re-imaging system 160, which is coupled to application-OS repository 104, and the host computer is coupled to a shared data repository 116. However, vulnerability profiles 102, application-OS repository, and shared data repository 116 may be implemented in the same storage unit, repository, or relational database system.

The application-OS repository 104 stores copies of application-OS images 114A, 114B. Shared data repository 116 can store data that the application-OS 114A, 114B generate in operation. Re-imaging system 160 can retrieve copies of application-OS images 114A, 114B and transfer the images to execution isolation system 108.

In an embodiment, application-OS repository 104 stores a hash value, message authentication code, or other digital signature of each application-OS 114A, 114B. When re-imaging system 160 retrieves and transfers a copy of a particular application-OS 114A to host computer 106, the re-imaging system generates a new digital signature based on the copy and determines whether new digital signature matches the stored digital signature. Thus, the re-imaging system 160 verifies a signature of the application-OS when an image of the application-OS 114A is transported into memory. In an embodiment, a digital signature on an application/OS is not required to comprise a single hash over a block device, as parts of the data stored in the application/OS may change, such as temporary files, page files, some registry entries, configuration files, stored state information, and file metadata such as access times. In an embodiment, a signature for an application/OS comprises a set of signatures for various files, registry entries, and/or blocks, stored in association with a list of which files, registry entries, and other data should match certain signatures, and which should only be noted as changed. Further, in an embodiment, vulnerability monitoring agent 110 may determine whether a running image of an application-OS has become corrupted by periodically computing a new digital signature over the running image and comparing the new digital signature to the digital signature that is stored in application-OS repository 104. If the signatures do not match, then the running image is corrupted and responsive action may be taken.

In an embodiment, upon detecting that any of application-OS 114A, 114B or an associated operating system is corrupted, the vulnerability monitoring agent 110 transfers a copy of data, which the corrupted application-OS 114A, 114B created, to shared data repository 116 with appropriate identifying information to facilitate later retrieval. The vulnerability monitoring agent 110 then requests re-imaging system 160 to obtain and load a new image of the corrupted application-OS 114A, 114B into execution isolation system 108. In response, re-imaging system 160 obtains a new image of the corrupted application-OS 114A, 114B from application-OS repository 104, restores the data from shared data repository 116 if necessary, and transfers the new image to the execution isolation system 108.

FIG. 1 depicts the re-imaging system 160 as within host computer 106. In one embodiment, the re-imaging system 160 resides in a storage area network (SAN).

In one embodiment, a sub network for monitoring execution is created starting at one or more cores of a processor of the host computer 106 through the use of the network I/O stack 140. Instances of the vulnerability monitoring agent 110 are deployed in the sub network along with other functional elements that provide policy-based enforcement as described herein. For example, the network I/O stack 140 may comprise a second instance of vulnerability monitoring agent 110, denoted VMA110A, and the second vulnerability monitoring agent is configured to monitor one or more interactions of the application program or the operating system with the network I/O stack. In such an embodiment, network monitors and inspection capabilities spread upward across the CPU dies and into the network. Physical computer clustering allows this aspect to scale and makes management simpler.

In another embodiment, hardware 130 comprises a single CPU die having multiple processor cores, and each processor core comprises an instance of vulnerability monitoring agent 110, controlled execution space 112A and application 114A. In this embodiment, the instances of vulnerability monitoring agent 110, controlled execution space and application can share monitored data over socket interfaces. Communications over the socket interfaces may be arbitrated by the instances of vulnerability monitoring agent 110 for security purposes and to prevent sending too many messages. In this embodiment, multiple hosts that are monitoring many different running operating system images in the controlled execution spaces 112A can share information about detected vulnerabilities. Running software is virtualized and run on logically partitioned hardware. Thus the execution runtimes may be based on one or more physical CPUs, for example, running in Symmetric Multi Processor (SMP) mode, or one or more virtual machines running distinct execution environments. In a VM environment with robust hardware isolation protections the physical constraints of a CPU die and multiple physical processors are less important. The intent of the description herein is to present an example allocation of virtual resources for running a reference monitor in the form of a vulnerability monitoring agent. Such protections can be embedded in the operating system, or can work in conjunction with an amortized network stack shared among the OS's running across VM's or both can work together to achieve better scaling. Moreover the vulnerability assessment can also scale out into the network. The vulnerability assessment agents can all be located in any one of these locations, or can be organized hierarchically to filter upstream.

Further, in such an embodiment re-imaging the OS-applications 114A is more practical and manageable, since the network stack 140 and execution isolation system 108 remain unchanged and unaffected by the re-imaging operations. The isolation mechanisms form a kind of internal firewall that contain any potential damage, but still obtain useful outcomes.

2.3 Operational Example

Figure 3:
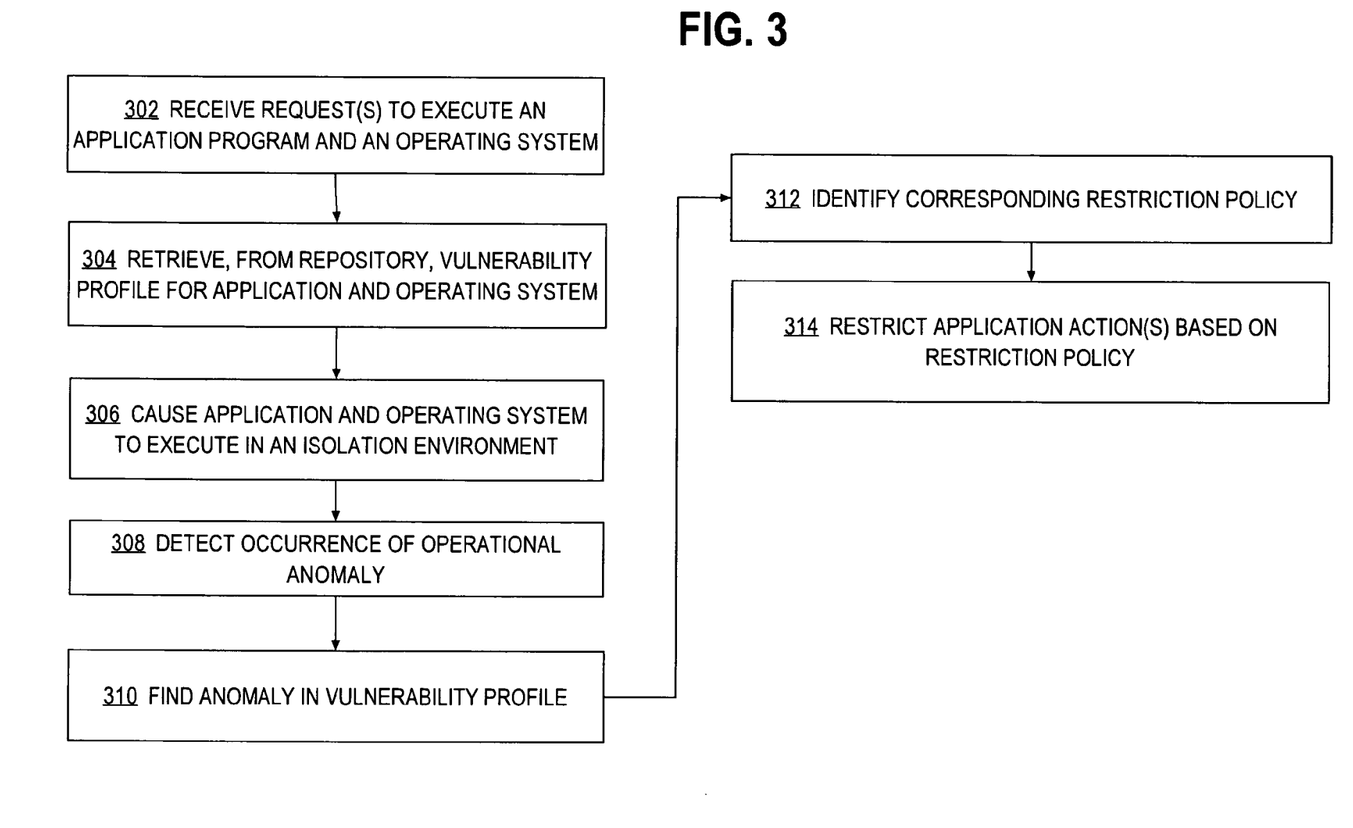
FIG. 3 is a flow diagram of an approach for restricting virtualized operating systems and applications using network context triggers.

FIG. 3 is a flow diagram of an approach for restricting virtualized operating systems and applications using network context triggers. In step 302, one or more requests are received to execute an application program and operating system. For example, vulnerability monitoring agent detects that execution isolation system 108 needs to load the application-OS 114A in the execution isolation system. Requests of step 302 may be received from operating system 120, a console port, or the management domain controller 150.

In step 304, a vulnerability profile is retrieved from a repository. The vulnerability profile corresponds to application-OS 114A and specifies one or more known vulnerabilities for that combination of an application and operating system.

In step 306, the process causes the application-OS 114A to execute in an isolation environment. For example, the application-OS 114A are loaded into execution isolation system 108 and executed in the controlled execution space 112A.

In step 308, an occurrence of an operational anomaly is detected. For example, step 308 involves vulnerability monitoring agent 110 detecting that an anomaly has occurred such as a page fault, attempt to access prohibited memory, attempt to access a prohibited port, etc.

When an occurrence of an anomaly is detected, in one embodiment, the process determines the remedial action for the application-OS based on one of the vulnerability profiles, and causes a remedial action. For example, in step 310, the process finds information defining the detected anomaly in a stored vulnerability profile. In an embodiment, vulnerability monitoring agent 110 retrieves information from vulnerability profiles 102 that matches the detected anomaly.

In step 312, a corresponding restriction policy is identified. For example, vulnerability monitoring agent 110 retrieves a restriction policy from vulnerability profiles 102 that matches the detected anomaly.

In step 314, one or more application actions or operating system actions are restricted based on the retrieved restriction policy. For example, vulnerability monitoring agent configures controlled execution space 112A or other resources of host computer 106 to prevent access to host computer resources, network resources, bandwidth, ports, etc. Alternatively, any of the other restrictions identified in this document may be performed. As a result, an OS-application 114A that has caused an anomaly cannot infect other resources, cause cascading application crashes, or propagate harmful functions among other applications, systems or resources. Further, decisions about restrictions are performed based on the present operating context, that is, the particular combination of application, operating system, and vulnerability that are present.

Figure 4:
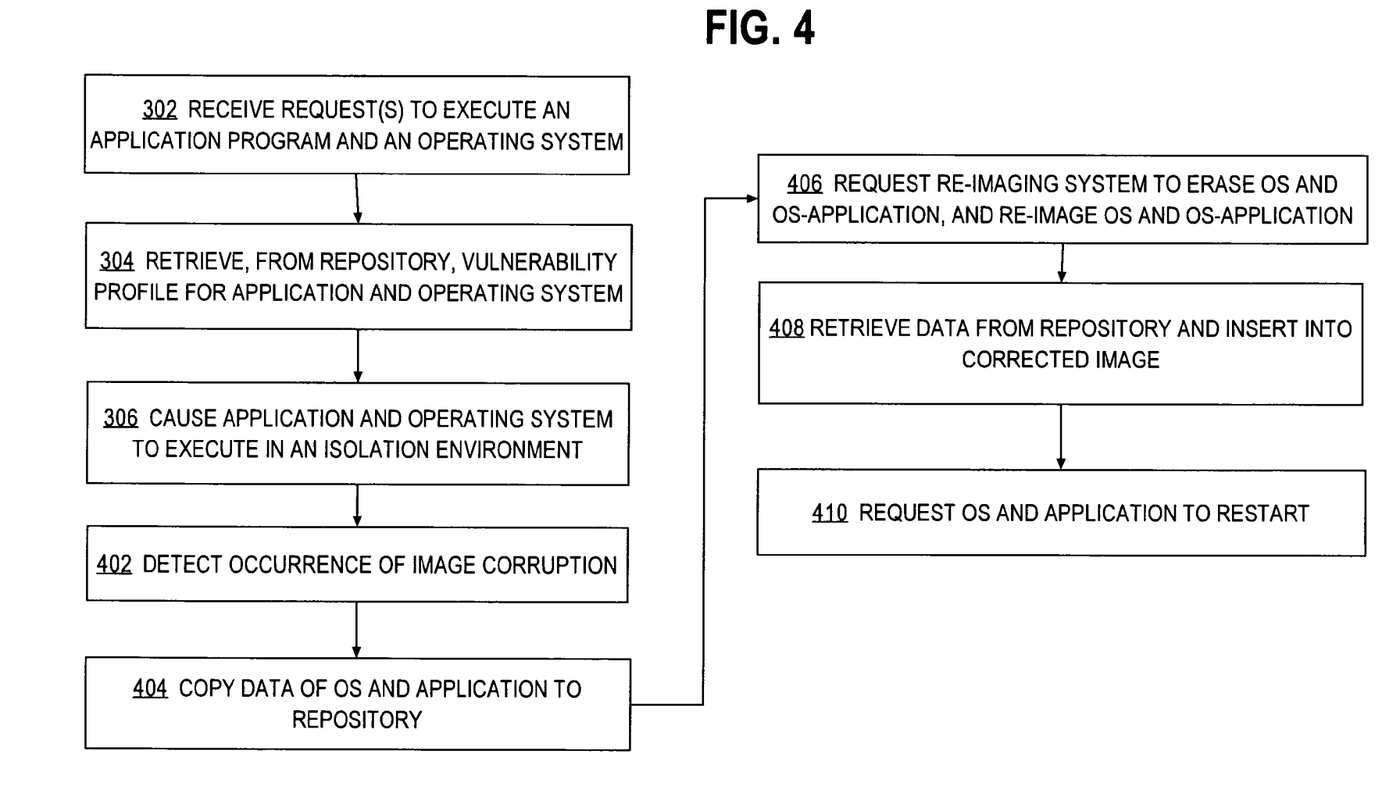
FIG. 4 is a flow diagram of an approach for re-imaging virtualized operating systems and applications based on preserved data and network context triggers.

FIG. 4 is a flow diagram of an approach for re-imaging virtualized operating systems and applications based on preserved data and network context triggers. The approach of FIG. 4 represents an alternative to FIG. 3 that can be used when an application-OS becomes corrupted or unstable. Thus, step 302 to step 306 of FIG. 4 proceed according to the description of FIG. 3 above. However, after step 306, in step 402, the system detects an occurrence of image corruption. For example, vulnerability monitoring agent 110 detects that an OS-application image 114A has become corrupted. In one embodiment, vulnerability monitoring agent 110 computes a new digital signature over the running image and compares the new digital signature to a trusted digital signature that is stored in application-OS repository 104. If the signatures do not match, then vulnerability monitoring agent 110 detects that the running image is corrupted.

In response, in step 404, the process copies data that the OS-application 114A has created to a repository, such as shared data repository 116. Step 404 operates to preserve data that the OS-application 114A has created, so that a subsequent restart can continue proper operation.

In step 406, the process requests a re-imaging system to erase the OS-application 114A and to re-image the OS-application. For example, vulnerability monitoring agent 110 requests re-imaging system 160 to replace the OS-application 114A. In response, re-imaging system 160 causes the OS-application 114A to be erased from the controlled execution space 112A, retrieves a replacement image from the application-OS repository 104, and transfers the replacement image to the controlled execution space 112A. In step 408, the data that was stored at step 404 is retrieved from the repository and inserted into the corrected image in the controlled execution space 112A. Thus, the new OS-application image is reunited with previously created data. The preceding functions may be performed by the execution isolation system 108, vulnerability monitoring agent 110, and re-imaging system 160 in combination or one of the functional units may have sole responsibility to perform re-imaging.

In step 410, the process requests the OS and the application to restart. In an embodiment, the virtual machine monitor controls allocation and provisioning of each virtual machine, and triggers BIOS reboots. As a result, a corrupted OS-application image is halted and the OS-application is restarted. Therefore, host computer 108 is protected and corruption of the OS-application image cannot spread to other applications on host computer or to other hosts, applications, systems or networks to which the host computer is coupled.

4.0 Implementation Mechanisms—Hardware Overview

Figure 5:
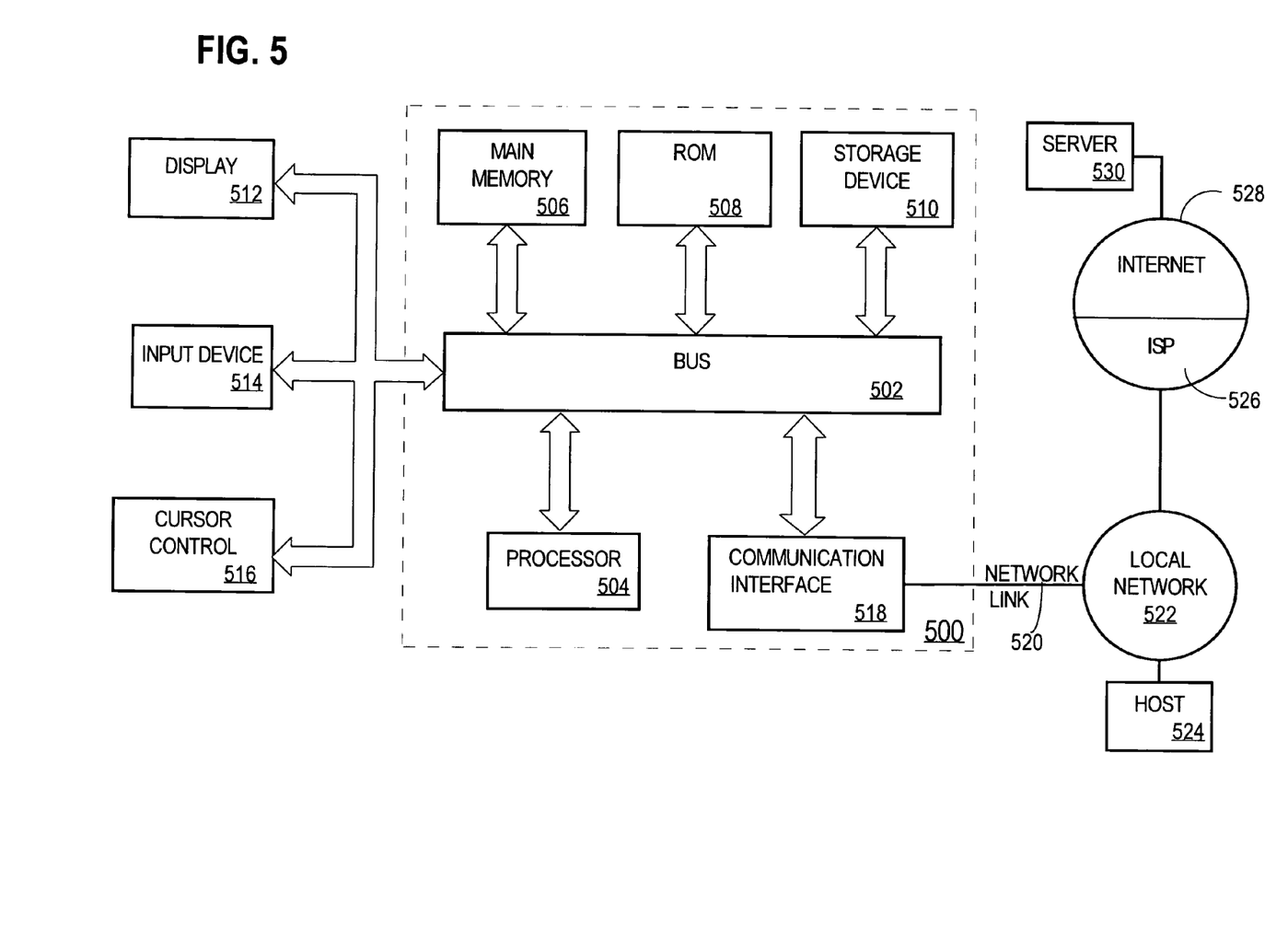
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. In FIG. 5, processor 504 broadly represents any of a single processor and single core or multiple processors and multiple cores. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for activating virtualized operating systems and applications based on network context triggers. According to one embodiment of the invention, activating virtualized operating systems and applications based on network context triggers is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for activating virtualized operating systems and applications based on network context triggers as described herein. The received code may be executed by processor 504 as it is received, and/or stored in storage device 510, or other non-volatile storage for later execution. In this manner, computer system 500 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer system, comprising:
one or more computing devices having one or more processors and one or more memory storing computer-executable instructions which, when executed by the one or more processors, cause the one or more processors to perform the steps of:
establishing a plurality of controlled execution spaces, each controlled execution space configured to host an operating system and an application program of an application-operating system pair;
creating and storing one or more vulnerability profiles, wherein each of the vulnerability profiles comprises an application program identifier, an operating system identifier, a vulnerability specification describing a vulnerability of the application program that the application program identifier indicates when executed with the operating system that the operating system identifier indicates, and a remedial action which when executed will remediate the vulnerability;
monitoring, by a vulnerability monitoring agent, execution of the application program and monitoring execution of the operating system as the application-operating system pair, comprising the operating system and the application program, is executing in a controlled execution space;
detecting an anomaly of corruption of the executions of the application program and the operating system;
determining an appropriate action for the operating system and the application program based on one of the vulnerability profiles and the detected anomaly of corruption;
in response to detecting that the application program executed under the operating system is corrupted, removing the application program and the operating system from the controlled execution space;
requesting re-imaging the controlled execution space with new copies of the application program and the operating system from a repository storing copies of applications and operating systems.

2. The computer system of claim 1, wherein the vulnerability monitoring agent is coupled to a re-imaging system, wherein the re-imaging system is coupled to the repository of copies of applications and operating systems.

3. The computer system of claim 2, wherein the vulnerability monitoring agent is further configured to generate a first digital signature based on one or more components or data sets associated with the application program and operating system, to retrieve a trusted second digital signature, and to determine whether the first digital signature matches the second digital signature.

4. The computer system of claim 2, wherein the vulnerability monitoring agent is coupled to a shared data repository and the re-imaging system, wherein the re-imaging system is coupled to the repository storing copies of applications and operating systems, and wherein the vulnerability monitoring agent is further configured to store data associated with the application program and the operating system in the shared data repository, to remove the application program and operating system from the controlled execution space, and to request the re-imaging system to re-image the controlled execution space with a new copy of the application program and the operating system.

5. The computer system of claim 2, wherein the appropriate action comprises extracting potentially corrupt data files, running the files through a scrubber to result in creating and storing non-corrupt data files, and providing the non-corrupt data files to the new copy of the application program and the operating system.

6. The computer system of claim 1, wherein a management domain controller is coupled to the vulnerability monitoring agent over a network, wherein the management domain controller is configured to control access to the one or more vulnerability profiles, to store policies for remediation actions, and to issue instructions to the vulnerability monitoring agent for taking actions.

7. The computer system of claim 1, wherein the controlled execution space comprises a virtual machine monitor.

8. The computer system of claim 1, wherein the vulnerability monitoring agent, controlled execution spaces, application program, and operating system are in a first computer, and wherein the one or more vulnerability profiles are in a second computer that is coupled to the first computer over a network.

9. The computer system of claim 1, further comprising an I/O stack, wherein the I/O stack comprises a second vulnerability monitoring agent, wherein the second vulnerability monitoring agent is configured to monitor one or more interactions of the application program or the operating system with the I/O stack.

10. The computer system of claim 1, further comprising a plurality of instances of the vulnerability monitoring agent, wherein each of the instances is hosted on one of the one or more processors, wherein each of the instances is configured to communicate information about detected anomaly of corruption to other instances over one or more arbitrated socket connections.

11. The computer system of claim 1, wherein the appropriate action further comprises restricting communications over one or more network interfaces, restricting use of one or more network resources, restricting use of resources of the computer system, restricting use of network bandwidth, restricting use of one or more network ports, or restricting read or write access to storage devices, file systems, directories, files, or registry entries.

12. A computer-implemented method, comprising:

establishing a plurality of controlled execution spaces, each controlled execution space configured to host an operating system and an application program of an application-operating system pair;

creating and storing one or more vulnerability profiles, wherein each of the vulnerability profiles comprises an application program identifier, an operating system identifier, a vulnerability specification describing a vulnerability of the application program that the application program identifier indicates when executed with the operating system that the operating system identifier indicates, and a remedial action which when executed will remediate the vulnerability;

monitoring, by a vulnerability monitoring agent, execution of the application program and monitoring execution of the operating system as the application-operating system pair, comprising the operating system and the application program, is executing in a controlled execution space;

detecting an anomaly of corruption of the executions of the application program and the operating system;

determining an appropriate action for the operating system and the application program based on one of the vulnerability profiles and the detected anomaly of corruption;

in response to detecting that the application program executed under the operating system is corrupted, removing the application program and the operating system from the controlled execution space;

requesting re-imaging the controlled execution space with new copies of the application program and the operating system from a repository storing copies of applications and operating systems;

wherein the method is performed by one or more processors.

13. The computer-implemented method of claim 12, further comprising generating a first digital signature of the application program and operating system, retrieving a trusted second digital signature, and determining whether the first digital signature matches the second digital signature.

14. The computer-implemented method of claim 12, further comprising:

storing data associated with the application program and the operating system in a shared data repository.

15. The computer-implemented method of claim 12, wherein the controlled execution space comprises a virtual machine monitor.

16. The computer-implemented method of claim 12, further comprising causing monitoring one or more interactions of the application program or the operating system with an I/O stack.

17. The computer-implemented method of claim 12, wherein the appropriate action comprises restricting communications over one or more network interfaces, restricting use of one or more network resources, restricting use of resources of the computer system, restricting use of network bandwidth, restricting use of one or more network ports, or restricting read or write access to storage devices, file systems, directories, files, or registry entries.

18. The computer-implemented method of claim 12, wherein the appropriate action comprises extracting potentially corrupt data files, running the files through a scrubber to result in creating and storing non-corrupt data files, and providing the non-corrupt data files to the application program and the operating system.

19. A non-transitory computer-readable storage medium, comprising computer-executable instructions which, when executed by one or more processors, cause the one or more processors to perform:
    establishing a plurality of controlled execution spaces, each controlled execution space configured to host an operating system and an application program of an application-operating system pair;
    creating and storing one or more vulnerability profiles, wherein each of the vulnerability profiles comprises an application program identifier, an operating system identifier, a vulnerability specification describing a vulnerability of the application program that the application program identifier indicates when executed with the operating system that the operating system identifier indicates, and a remedial action which when executed will remediate the vulnerability;
    monitoring, by a vulnerability monitoring agent, execution of the application program and monitoring execution of the operating system as the application-operating system pair, comprising the operating system and the application program, is executing in a controlled execution space;
    detecting an anomaly of corruption of the executions of the application program and the operating system;
    determining an appropriate action for the operating system and the application program based on one of the vulnerability profiles and the detected anomaly of corruption;
    in response to detecting that the application program executed under the operating system is corrupted, removing the application program and the operating system from the controlled execution space;
    requesting re-imaging the controlled execution space with new copies of the application program and the operating system from a repository storing copies of applications and operating systems.

20. The non-transitory computer-readable storage medium of claim 19, further comprising computer-executable instructions which, when executed, cause the one or more processors to perform: generating a first digital signature of the application program and operating system, retrieving a trusted second digital signature, and determining whether the first digital signature matches the second digital signature.

21. The non-transitory computer-readable storage medium of claim 19, further comprising computer-executable instructions which, when executed, cause the one or more processors to perform:
    storing data associated with the application program and the operating system in a shared data repository.

22. The non-transitory computer-readable storage medium of claim 19, wherein the controlled execution space comprises a virtual machine monitor.

23. The non-transitory computer-readable storage medium of claim 19, further comprising computer-executable instructions which, when executed, cause the one or more processors to perform:
    causing monitoring one or more interactions of the application program or the operating system with an I/O stack.

24. The non-transitory computer-readable storage medium of claim 19, further comprising computer-executable instructions which, when executed, cause the one or more processors to perform:
    restricting communications over one or more network interfaces, restricting use of one or more network resources, restricting use of resources of the computer system, restricting use of network bandwidth, restricting use of one or more network ports, or restricting read or write access to storage devices, file systems, directories, files, or registry entries.

\* \* \* \* \*